United States Patent
Fischer et al.

(10) Patent No.: US 6,621,904 B1
(45) Date of Patent: Sep. 16, 2003

(54) PRE-CHARGING LINE MODEM CAPACITORS TO REDUCE DC SETUP TIME

(75) Inventors: Jonathan Herman Fischer, Blandon, PA (US); Keith Eugene Hollenbach, Kutztown, PA (US); Donald Raymond Laturell, Allentown, PA (US); Lane A. Smith, Easton, PA (US); Weilin Zhu, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/407,444

(22) Filed: Sep. 29, 1999

(51) Int. Cl.[7] .......................... H04M 1/00; H04M 9/00; H04M 9/08
(52) U.S. Cl. .......................... 379/413.01; 379/399.01; 379/395.01; 379/403; 375/297
(58) Field of Search .................. 379/387.01, 388.06, 379/399.01, 390.04, 394, 395.01, 398, 403, 413, 413.01, 413.02; 375/268, 287, 297, 300, 353

(56) References Cited

U.S. PATENT DOCUMENTS

| 4,306,122 A | * 12/1981 | Nijman et al. ......... 379/399.01 |
| 4,631,366 A | * 12/1986 | Takato et al. ................ 340/333 |
| 5,999,619 A | * 12/1999 | Bingel ........................ 379/394 |

FOREIGN PATENT DOCUMENTS

EP        0 600 175 A1 * 8/1994 .......... H04M/19/00

* cited by examiner

Primary Examiner—Binh Tieu
(74) Attorney, Agent, or Firm—Duane Morris LLP

(57) ABSTRACT

A circuit provides a modulation signal to an input terminal of a line modulator which places a line current modulated in accordance with the modulation signal on a telephone line. An amplifier of the circuit amplifies an analog input signal to provide the modulation signal at an output terminal. A first resistor and a first capacitor are coupled in series between a first input terminal of the amplifier and the line, and a second resistor and a second capacitor are coupled in series between a second input terminal of the amplifier and the line. First and second precharge amplifiers are used to precharge the first and second capacitors, respectively, to reduce DC setup time.

15 Claims, 2 Drawing Sheets

100

200

300

PRE-CHARGING LINE MODEM CAPACITORS TO REDUCE DC SETUP TIME

CROSS-REFERENCES TO RELATED APPLICATIONS

This Application is related to commonly-owned U.S. patent application Ser. No. 09/310,021, entitled "Digital Gyrator," filed May 11, 1999, the entirety of which is incorporated herein by reference.

BACKGROUND OF THE INVENTION

1. Field of the Invention

The present invention relates to telephone line terminal equipment (e.g., modems) and, in particular, to setting the appropriate DC current on the line to seize the line.

2. Description of the Related Art

Telephone lines are widely used for various forms of communications, including digital communications between computers such as PCs, with the use of terminal equipment such as modems. Modems are coupled between a computer (digital data source and sink) and a telephone line, and typically include various components such as a digital signal processor (DSP), CODEC (coder/decoder), line modulator (LM), and the like. The CODEC receives from the DSP the digital signal which is to be modulated and then transmitted by the line modulator. The CODEC therefore typically comprises a digital-to analog converter (DAC) and associated circuitry which processes the analog signal received from the DAC to provide a suitable analog voltage signal to the input of the LM. The LM, which is a voltage-controlled current source, then modulates an output current in accordance with this analog voltage signal.

Many of these components, such as the CODEC and DAC, are powered by the telephone line itself. When a modem is to be used to communicate with a remote modem via the telephone line, the LM is coupled by a suitable switch to the telephone lines, thereby providing power for these components. At this time, the telephone line is "off-hook," i.e. in use.

One of the common system requirements for telecommunications systems is that, when a telephone line goes off hook, the DC current level on the line must reach a certain level within a specified period of time and maintain that level until the call is completed. The DC current level on the line must stay at a certain level in order to be interpreted by the telephone system (e.g., the telephone system central office (CO) to which the line is coupled) as an active line throughout the duration of the telephone call. (The current rise time and maximum current level are also specified in telecommunication systems to prevent damage to telecommunication equipment.) Asserting th appropriate DC line current within the specified time period is sometimes referred to as seizing the line.

When a modem is used, it must therefore seize the line within a specified time, in order to establish a telecommunications path or circuit. The time period from the time the LM is powered up (by coupling it to the telephone line so that it goes off hook) until the required DC line current is asserted by the LM may be referred to herein as the DC setup time. The specified time period during which acceptable DC line current must be asserted may thus be referred to as the maximum DC setup time. Thus, a modem must have a DC setup time that is less than the applicable maximum DC setup time in order to establish a call.

Telephone systems throughout the world have unique system requirements that need to be followed in order to legally sell and use telecommunication devices within their respective borders. These different systems have varying maximum DC setup times. One solution to this problem involves using a standard or typical modem with a variety of external components which can be switched in and out based on specific country requirements. However, this can be inconvenient and costly.

Thus, if a modem in use in a given country or telephone system is to be able to communicate with modems in other telephone systems without the necessity to change external components, the modem must have a DC setup time less than that of the smallest maximum DC setup time of all telephone systems. Currently, this smallest maximum DC setup time is 20 ms. Thus, a modem having a DC setup time less than 20 ms is compatible with the telephone systems of all countries. It is, therefore, desirable for a given modem to achieve a DC setup time in less than some specified maximum, to achieve compatibility with diverse telephone systems and to minimize the need to change equipment or configurations to place calls to any of the telephone systems.

SUMMARY

A circuit provides a modulation signal to an input terminal of a line modulator which places a line current modulated in accordance with the modulation signal on a telephone line. An amplifier of the circuit amplifies an analog input signal to provide the modulation signal at an output terminal. A first resistor and a first capacitor are coupled in series between a first input terminal of the amplifier and the line, and a second resistor and a second capacitor are coupled in series between a second input terminal of the amplifier and the line. First and second precharge amplifiers are used to precharge the first and second capacitors, respectively, to reduce DC setup time.

DESCRIPTION OF THE PREFERRED EMBODIMENT

Figure 1:
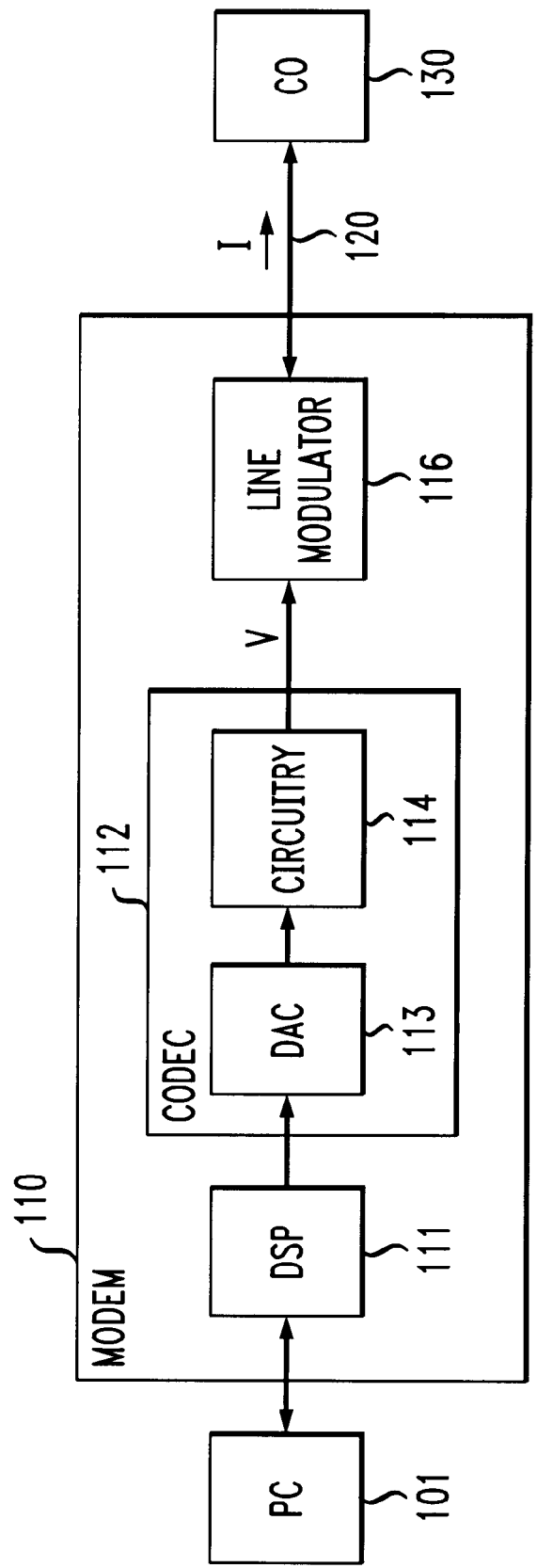
FIG. 1 is a block diagram of a modem-based system for providing digital communication between a computer and a remote modem via a telephone line.

Referring now to FIG. 1, there is shown a block diagram of a modem-based system 100 for providing digital communication between a computer 101 and a remote modem (not shown) via a telephone line 120. A computer such as PC (personal computer) 101 is coupled to modem 110, which is coupled to a telephone system central office (CO) 130 via telephone line 120. Modem 110 receives data from PC 101 to be transmitted via line 120 to CO 130 or some further recipient beyond CO 130.

DSP 111 of the modem processes the data and provides a processed digital bitstream to CODEC 112, which provides an output voltage signal or modulation signal to line modulator (LM) 116. LM 116 is a current source which modulates a current placed on line 120 in accordance with the modulation signal V received from CODEC 112.

CODEC comprises a digital-to-analog converter (DAC) 113, and circuitry 114, the function of which is to process the analog signal received from DAC 113 and to output a conditioned voltage signal V to LM 116. The present invention involves circuitry 114 and ensuring that it has a sufficiently small DC setup time. The circuitry 114, as well as that shown in FIGS. 2 and 3, and other components of CODEC 113 and modem 110 may be fabricated in one ore more integrated circuits (ICs), within a semiconductor chip, formed in the substrate of a physical wafer, e.g. a silicon wafer.

Figure 2:
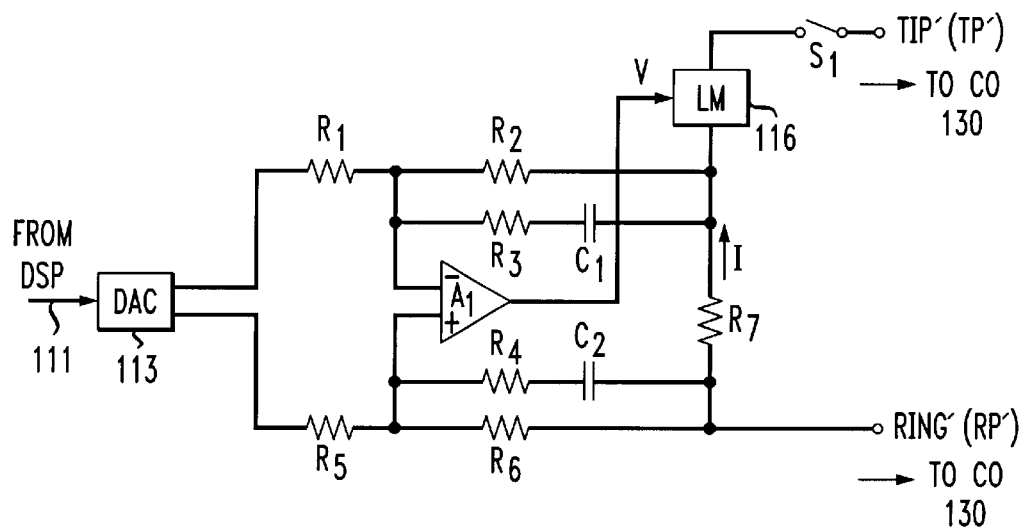
FIG. 2 is a circuit diagram illustrating a portion of a CODEC.

Referring now to FIG. 2, there is shown a circuit diagram illustrating a portion of the circuitry 200 of a CODEC such as CODEC 112 and related components of system 100. Amplifier $A_1$, Resistors $R_1$, $R_3$, $R_4$, $R_5$, and DAC 113 may be considered as part of CODEC 112. Resistors $R_2$, $R_6$, and capacitors $C_1$, $C_2$ are placed in modem 110 between CODEC 112 and LM 116.

When a call is to be initiated by system 100, LM 116 is coupled to telephone line 120 (TP' and RP') by the closing of an effective switch $S_1$, which provides power to LM 116 and to amplifier $A_1$ and DAC 113, i.e. to LM 116 and various components of the CODEC 112. The resistor-capacitor pairs $R_3$, $C_1$ and $R_4$, $C_2$ set the AC gain (for the input signal received from DAC 113 to the output or modulation signal V provided to LM 116) at the desired levels. One unique feature of circuitry 200 is that the same circuitry is used for both DC and AC. However, this gives rise to a DC setup problem.

To have a low enough frequency response for the full voice band (e.g., down to about 50 Hz and up to about 4 kHz), capacitors $C_1$, $C_2$ need to be large enough so there is not undue frequency response distortion of the signal. However, larger capacitors take a longer time to charge up, i.e. to finish settling down. The settling time may be as large as 400 ms, for example. During the time that the capacitors are charging, the transient charging current is added to the desired DC current level set by DAC 113, causing a large error in the DC line current that lasts longer than the 20 ms setup time limit. Thus, when LM 116 is powered up, the time constants of resistor-capacitor pairs $R_3$, $C_1$ and $R_4$, $C_2$ cause DC current errors that result in a delayed DC setup time.

Figure 3:
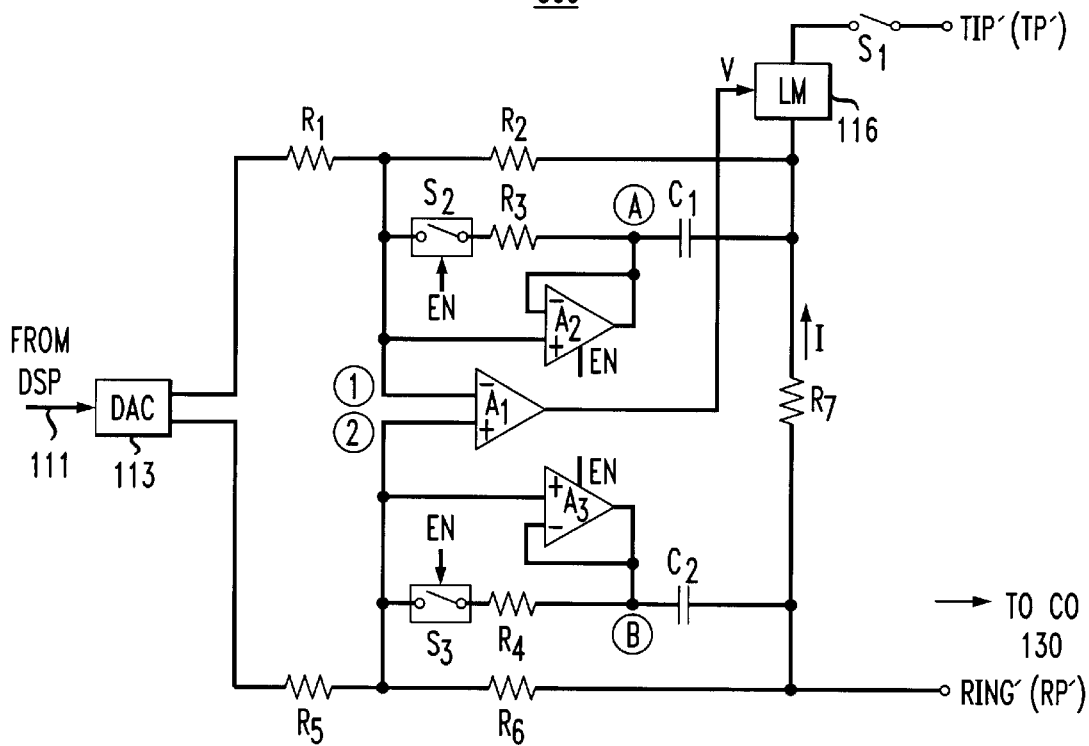
FIG. 3 is a circuit diagram illustrating a portion of the CODEC of the modem of FIG. 1 in further detail, in accordance with an embodiment of the present invention.

Referring now to FIG. 3, there is shown a circuit diagram 300 of the circuitry used in circuitry 114 and related components of a system such as system 100, in accordance with an embodiment of the present invention. The difference between circuitry 300 and 200 is that in circuitry 300, two precharge amplifiers $A_2$, $A_3$ are utilized as voltage followers, and switches $S_2$, $S_3$ are in place as illustrated, to precharge capacitors $C_1$, $C_2$ during a precharge phase to their correct operating voltage, so as to reduce the DC setup time that would otherwise be required due to the effect of these capacitors.

Precharge amplifiers $A_2$, $A_3$ are configured as voltage followers to equalize nodes 1 and A with each other, and nodes 2 and B with each other, respectively. They are enabled and disabled in accordance with an EN signal. The goal is to raise node A up to the voltage at node 1 as quickly as possible, and to raise node B's voltage up to that of node 2 as quickly as possible, thereby precharging capacitors $C_1$, $C_2$, respectively. Because no DC current passes through resistors $R_3$, $R_4$, the voltages on nodes A and B should equalize those of nodes 1 and 2 very quickly, due to the operation of precharge amplifiers $A_1$, $A_2$.

These amplifiers $A_1$, $A_2$ are only operational when they are enabled by a high enable signal EN, which is received, in one embodiment, from CODEC 112. CODEC 112 generates, with internal timers, a high EN signal from the beginning of the power up phase and for some time period sufficient to allow the capacitors to be pre-charged enough so as to sufficiently reduce the DC setup time.

The inventors have determined that the precharge operation can be enhanced by adding switches $S_2$, $S_3$, which are also controlled by the EN signal so that they are open during the precharge phase (when EN is high). Switch $S_2$ is in series between resistor $R_3$ and node 1, and switch $S_3$ is in series between resistor $R_4$ and node 2. Without the presence of switches $S_2$, $S_3$ (as in FIG. 2) to isolate node B from node 2 and node A from node 1 during the precharge phase, the voltages at nodes A and B can be different from nodes 1 and 2, respectively, due to the op-amp offset voltages of amplifiers $A_2$, $A_3$ and DC voltage drops in the precharge current path. This voltage is effectively across resistors $R_3$, $R_4$, and will develop an error current into the summing nodes of $A_1$ and change the desired DC current setting of LM 116.

Thus, switches $S_2$, $S_3$, in an embodiment, are placed in series with resistors $R_3$, $R_4$ to eliminate them from the circuit during the precharge phase.

In one embodiment, the precharge phase lasts for approximately 60 ms, that is, longer than the minimum required DC setup time (e.g., 20 ms) but shorter than the time at which AC signal is expected to begin (typically 500 ms to is after line 120 is placed off-hook by modem 120). In an embodiment, this achieves a DC setup time of approximately 5 ms, far smaller than the maximum allowed of 20 ms.

Thus, when switch $S_1$ is closed and line 120 is initially placed off-hook, at the beginning of power-up, a high EN signal is generated for approximately 60 ms (the precharge phase). Capacitors $C_1$ and $C_2$ precharge in approximately 20 to 30 ms (the capacitors must charge in under 60 ms). While capacitors $C_1$ and $C_2$ are being precharged by $A_2$ and $A_3$, respectively, at approximately 5 ms, the correct DC operating point for $A_1$ is established and the DC level in LM 116 settles. Switches $S_2$, $S_3$ and $A_2$ and $A_3$ thus decouple setting the DC level of LM 116 and charging $C_1$ and $C_2$ to their steady state DC voltages.

The role of the DSP and line modulator in setting the line current is described in farther detail in U.S. patent application Ser. No. 09/310,021, entitled "Digital Gyrator," the entirety of which is incorporated herein by reference. Thus, in one embodiment, the precharge phase lasts longer than the DC setup time and the maximum DC setup time to ensure settling and smooth circuit operation, and the DC setup time is less than the maximum DC setup time. At the end of the precharge phase (60 ms), the EN signal drops to low, causing switches $S_2$, $S_3$ to close and precharge amplifiers $A_2$, $A_3$ to shut off. Some time later, e.g 500 ms to 1s after power-up, AC signals and thus data begin to pass through circuit 300.

It will be understood that various changes in the details, materials, and arrangements of the p arts which have been described and illustrated above in order to explain the nature of this invention may be made by those skilled in the art without departing from the principle and scope of the invention as recited in the following claims.

What is claimed is:

1. An apparatus for providing a modulation signal to an input terminal of a line modulator, wherein the line modulator places a line current modulated in accordance with the modulation signal on a communications line, the apparatus comprising:

(a) an amplifier which amplifies an analog input signal to provide the modulation signal at an output terminal;

(b) a first resistor and a first capacitor coupled in series between a first input terminal of the amplifier and the line and a second resistor and a second capacitor coupled in series between a second input terminal of the amplifier and the line; and (c) first and second precharge amplifiers for precharging the first and second capacitors, respectively, to reduce DC setup time.

2. The apparatus of claim 1, wherein:

the first precharge amplifier is coupled at a positive input terminal to the first input terminal of the amplifier and at a negative input terminal and an output terminal to a junction between the first resistor and first capacitor; and the second precharge amplifier is coupled at a positive input terminal to the second input terminal of the amplifier and at a negative input terminal and an output terminal to a junction between the second resistor and second capacitor.

3. The apparatus of claim 2, wherein each precharge amplifier has an enable input terminal for enabling said precharge amplifiers in response to an enable signal, wherein the enable signal enables the precharge amplifiers during an initial time period after the line modulator is coupled to the line.

4. The apparatus of claim 3, further comprising first and second switches responsive to the enable signal and coupled between the output terminal and positive input terminal of the first and second precharge amplifiers, respectively, to isolate the output terminal of each precharge amplifier from its positive input terminal when the enable signal is on.

5. The apparatus of claim 1, wherein the communications line is a telephone line.

6. The apparatus of claim 1, wherein the first input terminal of the amplifier is a negative differential input terminal and the second input terminal of the amplifier is a positive differential input terminal.

7. The apparatus of claim 1, wherein the line modulator is unable to place a DC line current on the line sufficient to seize the line after being coupled thereto until the first and second capacitors are precharged.

8. The apparatus of claim 1, wherein the apparatus is a signal-conditioning circuit of a CODEC, wherein the signal-conditioning circuit is coupled to an output terminal of a digital-to-analog converter of the CODEC.

9. The apparatus of claim 8, wherein the digital-to-analog converter receives a digital signal from a digital signal source, wherein the digital signal contains information which is to be transmitted in modulatd form via the telephone line.

10. The apparatus of claim 1, wherein the apparatus is a CODEC further comprising a digital-to-analog converter for providing the analog input signal to the signal conditioning circuit.

11. The apparatus of claim 1, wherein the apparatus is a modem comprising a digital signal source, a CODEC, and the line modulator, the CODEC comprising elements (a), (b) and (c) and a digital-to-analog converter for converting the digital signal into the analog input signal.

12. A circuit for receiving an analog signal from an analog signal source and for providing a modulation signal to an input of a line modulator for placing a line current on a telephone line, wherein the line current is modulated in accordance with the modulation signal, the circuit comprising:

(a) an amplifier having negative and positive differential input terminals, and an output terminal which provides the modulation signal;

(b) first and second precharge amplifiers, each having negative and positive differential input terminals and an output terminal, wherein the positive input terminal of the first precharge amplifier is coupled to the negative input terminal of the amplifier and the positive input terminal of the second precharge amplifier is coupled to the positive input terminal of the amplifier, further wherein the negative input terminal of each precharge amplifier is coupled to its respective output terminal, each precharge amplifier having an enable input for selectively enabling or disabling said precharge amplifiers in response to an enable signal applied to the enable input;

(c) a first resistor coupled between the negative input terminal of the amplifier and the junction of the output terminal of the first precharge amplifier and a first terminal of a first capacitor, wherein the first capacitor is coupled at a second terminal to the telephone line;

(d) a second resistor coupled between the positive input terminal of the amplifier and the junction of the output terminal of the second precharge amplifier and a first terminal of a second capacitor, wherein the second capacitor is coupled at a second terminal to the telephone line; and (e) a third resistor coupled between the negative input terminal of the amplifier and the telephone line, a fourth resistor coupled between the positive input terminal of the amplifier and the telephone line, a fifth resistor coupled between the negative input terminal of the amplifier and a first output terminal of the analog signal source, and a sixth resistor coupled between the positive input terminal of the amplifier and a second output terminal of the analog signal source.

13. The circuit of claim 12, wherein the analog signal source is a digital-to-analog converter coupled at an input to a digital signal source.

14. The circuit of claim 12, further comprising first and second switches which open in response to the enable signal and which are coupled between the output terminal and positive input terminal of the first and second precharge amplifiers, respectively.

15. The circuit of claim 12, further comprising a seventh resistor coupled in the telephone line between the first and second capacitors.

* * * * *